(12) United States Patent
Binderbauer et al.

(10) Patent No.: US 11,901,087 B2
(45) Date of Patent: *Feb. 13, 2024

(54) SYSTEMS AND METHODS FOR MERGING AND COMPRESSING COMPACT TORI

(71) Applicant: TAE TECHNOLOGIES, INC., Foothill Ranch, CA (US)

(72) Inventors: Michl W. Binderbauer, Ladera Ranch, CA (US); Vitaly Bystritskii, Irvine, CA (US); Toshiki Tajima, Foothill Ranch, CA (US)

(73) Assignee: TAE TECHNOLOGIES, INC., Foothill Ranch, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/549,426

(22) Filed: Dec. 13, 2021

(65) Prior Publication Data
US 2022/0208400 A1  Jun. 30, 2022

Related U.S. Application Data

(63) Continuation of application No. 16/862,044, filed on Apr. 29, 2020, now Pat. No. 11,200,990, which is a
(Continued)

(51) Int. Cl.
*G21B 3/00* (2006.01)
*G21B 1/05* (2006.01)
(Continued)

(52) U.S. Cl.
CPC .............. *G21B 3/006* (2013.01); *G21B 1/03* (2013.01); *G21B 1/052* (2013.01); *H05H 1/54* (2013.01); *H05H 1/16* (2013.01); *Y02E 30/10* (2013.01)

(58) Field of Classification Search
None
See application file for complete search history.

(56) References Cited

U.S. PATENT DOCUMENTS 3,036,963 A   5/1962   Christofilos
3,071,525 A   1/1963   Christofilos
(Continued)

FOREIGN PATENT DOCUMENTS

CN   101320599        12/2008
EP    1856702 A2 *  11/2007   ............ G21B 1/05
(Continued)

OTHER PUBLICATIONS

EP, 15854636.6 Supplementary Search Report, dated May 17, 2018.
(Continued)

*Primary Examiner* — Srinivas Sathiraju
(74) *Attorney, Agent, or Firm* — ONE LLP

(57) ABSTRACT

Systems and methods utilizing successive, axially symmetric acceleration and adiabatic compression stages to heat and accelerate two compact tori towards each other and ultimately collide and compress the compact tori within a central chamber. Alternatively, systems and methods utilizing successive, axially asymmetric acceleration and adiabatic compression stages to heat and accelerate a first compact toroid towards and position within a central chamber and to heat and accelerate a second compact toroid towards the central chamber and ultimately collide and merge the first and second compact toroids and compress the compact merge tori within the central chamber.

20 Claims, 5 Drawing Sheets

Related U.S. Application Data continuation of application No. 16/277,441, filed on Feb. 15, 2019, now Pat. No. 10,665,351, which is a continuation of application No. 15/483,984, filed on Apr. 10, 2017, now Pat. No. 10,217,532, which is a continuation of application No. PCT/US2015/055172, filed on Oct. 12, 2015.

(60) Provisional application No. 62/064,346, filed on Oct. 15, 2014, provisional application No. 62/063,382, filed on Oct. 13, 2014.

(51) Int. Cl.
*H05H 1/54* (2006.01)
*G21B 1/03* (2006.01)
*H05H 1/16* (2006.01)

(56) References Cited

U.S. PATENT DOCUMENTS

| | | |
|---|---|---|
| 3,120,470 A | 2/1964 | Imhoff et al. |
| 3,132,996 A | 5/1964 | Baker et al. |
| 3,170,841 A | 2/1965 | Post |
| 3,182,213 A | 5/1965 | Rosa |
| 3,258,402 A | 6/1966 | Farnsworth |
| 3,386,883 A | 6/1968 | Farnsworth |
| 3,527,977 A | 9/1970 | Ruark |
| 3,530,036 A | 9/1970 | Hirsch |
| 3,530,497 A | 9/1970 | Hirsch et al. |
| 3,577,317 A | 5/1971 | Woods |
| 3,621,310 A | 11/1971 | Takeuchi et al. |
| 3,663,362 A | 5/1972 | Stix |
| 3,664,921 A | 5/1972 | Christofilos |
| 3,668,065 A | 6/1972 | Moir |
| 3,859,164 A | 1/1975 | Nowak |
| 4,010,396 A | 3/1977 | Ress et al. |
| 4,054,846 A | 10/1977 | Smith et al. |
| 4,057,462 A | 11/1977 | Jassby et al. |
| 4,065,351 A | 12/1977 | Jassby et al. |
| 4,098,643 A | 7/1978 | Brown |
| 4,125,431 A | 11/1978 | Fowler |
| 4,166,760 A | 9/1979 | Fowler et al. |
| 4,182,650 A | 1/1980 | Fischer |
| 4,189,346 A | 2/1980 | Jarnagin |
| 4,202,725 A | 5/1980 | Jarnagin |
| 4,233,537 A | 11/1980 | Limpaecher |
| 4,246,067 A | 1/1981 | Linlor |
| 4,267,488 A | 5/1981 | Wells |
| 4,274,919 A | 6/1981 | Jensen et al. |
| 4,303,467 A | 12/1981 | Scornavacca et al. |
| 4,314,879 A | 2/1982 | Hartman et al. |
| 4,317,057 A | 2/1982 | Bazarov et al. |
| 4,347,621 A | 8/1982 | Dow |
| 4,350,927 A | 9/1982 | Maschke |
| 4,354,998 A | 10/1982 | Ohkawa |
| 4,363,776 A | 12/1982 | Yamada et al. |
| 4,371,808 A | 2/1983 | Urano et al. |
| 4,390,494 A | 6/1983 | Salisbury |
| 4,397,810 A | 8/1983 | Salisbury |
| 4,416,845 A | 11/1983 | Salisbury |
| 4,434,130 A | 2/1984 | Salisbury |
| 4,483,737 A | 11/1984 | Mantei |
| 4,543,231 A | 9/1985 | Ohkawa |
| 4,543,465 A | 9/1985 | Sakudo et al. |
| 4,548,782 A | 10/1985 | Manheimer et al. |
| 4,560,528 A | 12/1985 | Ohkawa |
| 4,584,160 A | 4/1986 | Kageyama |
| 4,584,473 A | 4/1986 | Hashimoto et al. |
| 4,601,871 A | 7/1986 | Turner |
| 4,615,755 A | 10/1986 | Tracy et al. |
| 4,618,470 A | 10/1986 | Salisbury |
| 4,630,939 A | 12/1986 | Mayes |
| 4,639,348 A | 1/1987 | Jarnagin |
| H235 H | 3/1987 | Kugel et al. |
| 4,650,631 A | 3/1987 | Knorr |
| 4,687,616 A | 8/1987 | Moeller |
| 4,734,247 A | 3/1988 | Schaffer |
| 4,826,646 A | 5/1989 | Bussard |
| 4,853,173 A | 8/1989 | Stenbacka |
| 4,894,199 A | 1/1990 | Rostoker |
| 4,904,441 A | 2/1990 | Sorensen et al. |
| 4,927,592 A | 5/1990 | Yamaguchi |
| 5,015,432 A | 5/1991 | Koloc |
| 5,041,760 A | 8/1991 | Koloc |
| 5,122,662 A | 6/1992 | Chen et al. |
| 5,147,596 A | 9/1992 | Weil |
| 5,160,694 A | 11/1992 | Steudtner |
| 5,160,695 A | 11/1992 | Bussard |
| 5,206,516 A | 4/1993 | Keller et al. |
| 5,207,760 A | 5/1993 | Dailey et al. |
| 5,339,336 A | 8/1994 | Sudan |
| 5,355,399 A | 10/1994 | Golovanivsky et al. |
| 5,420,425 A | 5/1995 | Bier et al. |
| 5,422,481 A | 6/1995 | Louvet |
| 5,473,165 A | 12/1995 | Stinnett et al. |
| 5,483,077 A | 1/1996 | Glavish |
| 5,502,354 A | 3/1996 | Correa et al. |
| 5,537,005 A | 7/1996 | Goebel et al. |
| 5,557,172 A | 9/1996 | Tanaka |
| 5,656,519 A | 8/1997 | Mogami |
| 5,677,597 A | 10/1997 | Tanaka |
| 5,747,800 A | 5/1998 | Yano et al. |
| 5,764,715 A | 6/1998 | Maenchen et al. |
| 5,811,201 A | 9/1998 | Skowronski |
| 5,846,329 A | 12/1998 | Hori et al. |
| 5,848,110 A | 12/1998 | Maenchen et al. |
| 5,923,716 A | 7/1999 | Meacham |
| 6,000,360 A | 12/1999 | Koshimizu |
| 6,084,356 A | 7/2000 | Seki et al. |
| 6,245,190 B1 | 6/2001 | Masuda et al. |
| 6,248,251 B1 | 6/2001 | Sill |
| 6,255,648 B1 | 7/2001 | Littlejohn et al. |
| 6,271,529 B1 | 8/2001 | Farley et al. |
| 6,322,706 B1 | 11/2001 | Ohkawa |
| 6,335,535 B1 | 1/2002 | Miyake et al. |
| 6,345,537 B1 | 2/2002 | Salamitou |
| 6,390,019 B1 | 5/2002 | Grimbergen et al. |
| 6,396,213 B1 | 5/2002 | Koloc |
| 6,408,052 B1 | 6/2002 | McGeoch |
| 6,452,168 B1 | 9/2002 | McLuckey et al. |
| 6,477,216 B2 | 11/2002 | Koloc |
| 6,488,807 B1 | 12/2002 | Collins et al. |
| 6,572,935 B1 | 6/2003 | He et al. |
| 6,593,539 B1 | 7/2003 | Miley et al. |
| 6,593,570 B2 | 7/2003 | Li et al. |
| 6,611,106 B2 | 8/2003 | Monkhorst et al. |
| 6,628,740 B2 | 9/2003 | Monkhorst et al. |
| 6,632,324 B2 | 10/2003 | Chan |
| 6,664,740 B2 | 12/2003 | Rostoker et al. |
| 6,712,927 B1 | 3/2004 | Grimbergen et al. |
| 6,755,086 B2 | 6/2004 | Salamitou et al. |
| 6,850,011 B2 | 2/2005 | Monkhorst et al. |
| 6,852,942 B2 | 2/2005 | Monkhorst et al. |
| 6,888,907 B2 | 5/2005 | Monkhorst et al. |
| 6,891,911 B2 | 5/2005 | Rostoker et al. |
| 6,894,446 B2 | 5/2005 | Monkhorst et al. |
| 6,922,649 B2 | 6/2005 | Hess et al. |
| 6,995,515 B2 | 2/2006 | Rostoker et al. |
| 7,002,148 B2 | 2/2006 | Monkhorst et al. |
| 7,015,646 B2 | 3/2006 | Rostoker et al. |
| 7,026,763 B2 | 4/2006 | Rostoker et al. |
| 7,040,598 B2 | 5/2006 | Raybuck |
| 7,115,887 B1 | 10/2006 | Hassanein et al. |
| 7,119,491 B2 | 10/2006 | Rostoker et al. |
| 7,126,284 B2 | 10/2006 | Rostoker et al. |
| 7,129,656 B2 | 10/2006 | Rostoker et al. |
| 7,180,242 B2 | 2/2007 | Rostoker et al. |
| 7,232,985 B2 | 6/2007 | Monkhorst et al. |
| 7,391,160 B2 | 6/2008 | Monkhorst et al. |
| 7,439,678 B2 | 10/2008 | Rostoker et al. |
| 7,459,654 B2 | 12/2008 | Monkhorst et al. |
| 7,477,718 B2 | 1/2009 | Rostoker et al. |
| 7,569,995 B2 | 8/2009 | Rostoker et al. |
| 7,613,271 B2 | 11/2009 | Rostoker et al. |

(56) References Cited

U.S. PATENT DOCUMENTS

| | | | |
|---|---|---|---|
| 7,719,199 B2 | 5/2010 | Monkhorst et al. | |
| 8,031,824 B2 | 10/2011 | Bystriskii et al. | |
| 8,461,762 B2 | 6/2013 | Rostoker et al. | |
| 8,537,958 B2 | 9/2013 | Laberge et al. | |
| 9,025,717 B2 | 5/2015 | Freeze | |
| 9,082,516 B2 | 7/2015 | Slough | |
| 9,265,137 B2 | 2/2016 | Rostoker et al. | |
| 9,370,086 B2 | 6/2016 | Rostoker et al. | |
| 9,386,676 B2 | 7/2016 | Rostoker et al. | |
| 9,424,955 B2 | 8/2016 | Laberge et al. | |
| 9,591,740 B2 * | 3/2017 | Belchenko | H05H 3/02 |
| 9,596,745 B2 | 3/2017 | Laberge et al. | |
| 9,672,943 B2 * | 6/2017 | Rostoker | G21D 7/00 |
| 9,741,457 B2 * | 8/2017 | Slough | H05H 1/02 |
| 9,924,587 B2 * | 3/2018 | Belchenko | H05H 3/02 |
| 9,967,963 B2 | 5/2018 | Zindler et al. | |
| 9,997,261 B2 | 6/2018 | Tuszewski et al. | |
| 10,049,774 B2 * | 8/2018 | Tuszewski | H05H 1/14 |
| 10,217,531 B2 * | 2/2019 | Rostoker | G21B 1/052 |
| 10,217,532 B2 * | 2/2019 | Binderbauer | G21B 3/006 |
| 10,361,005 B2 * | 7/2019 | Rostoker | G21B 1/05 |
| 10,398,016 B2 * | 8/2019 | Belchenko | H05H 3/02 |
| 10,418,170 B2 * | 9/2019 | Rath | G21B 1/052 |
| 10,438,702 B2 | 10/2019 | Tuszewski et al. | |
| 10,440,806 B2 * | 10/2019 | Binderbauer | H05H 1/14 |
| 10,446,275 B2 | 10/2019 | Tuszewski et al. | |
| 10,665,351 B2 * | 5/2020 | Binderbauer | G21B 1/03 |
| 10,743,398 B2 * | 8/2020 | Binderbauer | H05H 1/14 |
| 10,790,064 B2 | 9/2020 | Tuszewski et al. | |
| 10,887,976 B2 * | 1/2021 | Belchenko | H05H 3/02 |
| 11,195,627 B2 * | 12/2021 | Dunaevsky | G21B 1/19 |
| 11,200,990 B2 * | 12/2021 | Binderbauer | G21B 1/03 |
| 11,217,351 B2 * | 1/2022 | Gonzalez | H05H 1/16 |
| 11,335,467 B2 * | 5/2022 | Yang | G21B 1/11 |
| 11,337,294 B2 * | 5/2022 | Binderbauer | G21B 1/052 |
| 11,363,708 B2 * | 6/2022 | Belchenko | H05H 3/02 |
| 2001/0006093 A1 | 7/2001 | Tabuchi et al. | |
| 2003/0197129 A1 | 10/2003 | Murrell et al. | |
| 2003/0230240 A1 | 12/2003 | Rostoker et al. | |
| 2003/0230241 A1 | 12/2003 | Rostoker et al. | |
| 2004/0107874 A1 | 5/2004 | Ghosh et al. | |
| 2004/0213368 A1 | 10/2004 | Rostoker et al. | |
| 2006/0198485 A1 | 9/2006 | Binderbauer | |
| 2007/0026161 A1 | 2/2007 | Madocks | |
| 2008/0226011 A1 | 9/2008 | Barnes | |
| 2010/0329947 A1 | 12/2010 | Fischel | |
| 2011/0026657 A1 | 2/2011 | Laberge et al. | |
| 2011/0142185 A1 | 6/2011 | Woodruff | |
| 2015/0055739 A1 | 2/2015 | Jarboe et al. | |
| 2015/0187443 A1 | 7/2015 | Tuszewski et al. | |
| 2015/0228369 A1 | 8/2015 | Cohen et al. | |
| 2015/0245461 A1 * | 8/2015 | Belchenko | H05H 3/02 250/251 |
| 2015/0294742 A1 | 10/2015 | Cohen | |
| 2016/0043522 A1 * | 2/2016 | Mourou | H01J 27/24 250/423 P |
| 2016/0098058 A1 | 4/2016 | Morehouse et al. | |
| 2016/0189803 A1 * | 6/2016 | Rostoker | H05H 1/14 376/126 |
| 2016/0226212 A1 * | 8/2016 | Tajima | H01S 3/067 |
| 2016/0276044 A1 * | 9/2016 | Tuszewski | G21B 1/052 |
| 2016/0329110 A1 * | 11/2016 | Rostoker | H05H 1/16 |
| 2017/0025189 A1 * | 1/2017 | Rostoker | G21B 1/052 |
| 2017/0099724 A1 * | 4/2017 | Tajima | H05G 2/00 |
| 2017/0135194 A1 * | 5/2017 | Belchenko | H05H 3/02 |
| 2017/0236599 A1 | 8/2017 | Bystriskii et al. | |
| 2017/0294238 A1 | 10/2017 | Zheng | |
| 2017/0303380 A1 | 10/2017 | Zindler et al. | |
| 2017/0337990 A1 * | 11/2017 | Rostoker | H05H 1/03 |
| 2017/0337991 A1 * | 11/2017 | Binderbauer | G21B 1/052 |
| 2017/0359886 A1 * | 12/2017 | Binderbauer | H05H 1/14 |
| 2018/0047461 A1 | 2/2018 | Cohen et al. | |
| 2018/0235068 A1 * | 8/2018 | Belchenko | H05H 3/02 |
| 2019/0035509 A1 | 1/2019 | Tuszewski et al. | |
| 2019/0139649 A1 | 5/2019 | Tuszewski et al. | |
| 2019/0318831 A1 * | 10/2019 | Dunaevsky | F04B 37/14 |
| 2019/0318834 A1 * | 10/2019 | Binderbauer | G21B 1/052 |
| 2019/0387606 A1 * | 12/2019 | Belchenko | H05H 3/02 |
| 2020/0045803 A1 * | 2/2020 | Binderbauer | H05H 1/08 |
| 2021/0045223 A1 * | 2/2021 | Binderbauer | H05H 1/14 |
| 2021/0110936 A1 | 4/2021 | Tuszewski et al. | |
| 2021/0110939 A1 * | 4/2021 | Binderbauer | G21B 1/052 |
| 2021/0168924 A1 * | 6/2021 | Belchenko | H05H 3/02 |
| 2021/0358650 A1 * | 11/2021 | Tajima | G21G 1/08 |
| 2022/0093280 A1 * | 3/2022 | Dunaevsky | G21B 1/19 |
| 2022/0208400 A1 * | 6/2022 | Binderbauer | H05H 1/54 |

FOREIGN PATENT DOCUMENTS

| | | | | |
|---|---|---|---|---|
| EP | 2389048 A2 | 11/2011 | | |
| FR | 2 270 733 A1 | 12/1975 | | |
| GB | 1 387 098 A | 3/1975 | | |
| JP | H03-285200 | 12/1991 | | |
| JP | 2010243501 A | * | 10/2010 | G21B 1/05 |
| JP | 2013101134 A | * | 5/2013 | G21B 1/05 |
| RU | 2 056 649 C1 | 3/1996 | | |
| WO | WO 02/062112 A2 | 8/2002 | | |
| WO | WO-2006096772 A2 | * | 9/2006 | G21B 1/05 |
| WO | WO 2013/074666 A2 | 5/2013 | | |
| WO | WO 2014/114986 A1 | 7/2014 | | |
| WO | WO 2015/048092 A1 | 4/2015 | | |
| WO | WO 2016/070126 A1 | 5/2016 | | |
| WO | WO 2017/083796 A1 | 5/2017 | | |

OTHER PUBLICATIONS

EP, 16865181.8 Extended Search Report, dated Oct. 15, 2018.
EP, 17866196.3 Extended Search Report, dated Jun. 2, 2020.
JP, 2018-524255 Office Action, dated Nov. 12, 2020.
SG, 11201803610Q Written Opinion, dated Aug. 21, 2019.
SG, 11201903545V Written Opinion, dated Apr. 30, 2020.
WO, PCT/US2016/061730 ISR and Written Opinion, dated Mar. 9, 2017.
WO, PCT/US2017/059067 ISR and Written Opinion, dated Jan. 12, 2018.
Anderson, M., et al., "Plasma and Ion Beam Injection into an FRC", Plasma Physics Reports, 2005, vol. 31, No. 10, pp. 809-817.
Arsenin, V.V., et al., "Suppression of plasma instabilities by the feedback method", Soviet Physics Uspekhi, 1977, vol. 20, No. 9, pp. 736-745.
Artsimovich, L.A., "Controlled Thermonuclear Reactions", English Edition, 1964, Gordon and Breach, Science Publishers, Inc., New York, pp. 1-9.
Asai, T., et al., "End Loss Measurement of Neutral-Beam-Injected Field-Reversed Configuration Plasma", J. Plasma Fusion Res. Series, vol. 5, 2002, pp. 220-224.
Asai, T., et al., "Experimental evidence of improved confinement in a high-beta field-reversed configuration plasma by neutral beam injection", Physics of Plasma, 2000, vol. 7, No. 6, pp. 2294-2297.
Avanzini, P.G., "Feasibility of Fusion Power Generation by Accelerated Ion Beams", ICENES, Jun. 30-Jul. 4, 1986, Geneva, Italy, pp. 305-309.
Becker, H.W., et al., "Low-Energy Cross Sections for $^{11}B(p,3\alpha)$", Z. Physics A—Atomic Nuclei, 1987, vol. 217, No. 3, pp. 341-355.
Binderbauer, M.W., et al., "Turbulent transport in magnetic confinement: how to avoid it", Journal of Plasma Physics, 1996, vol. 56, No. 3, pp. 451-465.
Binderbauer, M.W., et al., "Dynamic Formation of a Hot Field Reversed Configuration with Improved Confinement by Supersonic Merging of Two Colliding High-β Compact Toroids", Phys. Rev. Lett., 2010, vol. 105, No. 4, pp. 045003-1-045003-4.
Bohm, D., "Quantum Theory", 1951, Dover Publications, Inc., New York, Chapter 12—Applications to Simple Systems, The Classical Limit and the WKB Approximation, pp. 277-283.
Bystritskii, V., et al., "Generation and Transport of a Low-Energy Intense Ion Beam", IEEE Transactions on Plasma Science, 2004, vol. 32, No. 5, pp. 1986-1992.
Bystritskii, V., et al., "Study of Dense FRCs Formation and Their Transport With Multistage Compression", IEEE 2013 IEEE Pulsed

(56) References Cited

OTHER PUBLICATIONS

Power and Plasma Science Conference (PPPS 2013)—San Francisco, CA, USA, Jun. 2013, 1 page.
Carlson, A., "Re: Boron/Proton colliding beam reactor?", 1997, retrieved from http://groups.google.com/groups?q=rostok...opuo.fsf%40s4awc.aug.ipp-garching.mpg.de, pp. 1-3.
Carlson, A., "Fundamental Limitations on Plasma Fusion Systems Not in Thermodynamic Equilibrium", 1997, retrieved from http://www.ipp.mpg.de/~Arthur.Carlson/rider.html, pp. 1-3.
Carlson, A., "Annotated Bibliography of p-B11 Fusion", 1998, retrieved from http://www.ipp.mpg.de/~Arthur.carlson/p-B11-bib.html, pp. 1-4.
Carlson, A., "Home Page of Dr. A. Carlson", 2000, retrieved from http://www/rzg/mpg.de/~awc/home.html, pp. 1-2.
Carlson, A., "Re: Lithium Fission—why not?," 2000, retrieved from http://groups.google.com/groups?q=rostok...v35u.fsi%40suawc.aug.ipp-garching.mpg.de, pp. 1-2.
Chao, A.W., et al., Handbook of Accelerator Physics and Engineering, $2^{nd}$ Printing, 1998, World Scientific, Chapter 2, pp. 53, 119-120.
Cohen, S.A., et al., "Ion Heating in the Field-Reversed Configuration by Rotating Magnetic Fields near the Ion-Cyclotron Resonance", Physical Review Letters, 2000, vol. 85, No. 24, pp. 5114-5117.
Cohen, S.A., et al., "Formation of Collisionless High-β Plasmas by Odd-Parity Rotating Magnetic Fields", Physical Review Letters, vol. 98, 2007, pp. 125002-1-145002-4.
Cohen, S.A., et al., "RMFo-Formed Collisionless High-β Plasmas: Yesterday, Today and Tomorrow", AIP Conference Proceedings, vol. 1154, 2009, pp. 165-166.
Cox, Jr., L/T., et al., "Thermonuclear Reaction Listing With Cross-Section Data for Four Advanced Reactions", Fusion Technology, 1990, vol. 18, No. 2, pp. 325-339.
Davis, H.A., et al., "Generation of Field-Reversing E Layers with Millisecond Lifetimes", Physical Review Letters, 1976, vol. 37, No. 9, pp. 542-545.
Dawson, J.M., "Advanced Fuels For CTR", Four Workshops in Alternate Concepts in Controlled Fusion, EPRI ER-429-SR, Special Report, Part B: Extended Summaries, 1977, pp. 143-147.
Dawson, J.M., "Alternate Concepts in Controlled Fusion", EPRI ER-429-SR, Special Report, Part C: CTR Using the $p-^{11}B$ Reaction, 1977, pp. ii-30.
Dobrott, D., "Alternate Fuels in Fusion Reactors", Nuclear Technology/Fusion, 1983, vol. 4, pp. 339-347.
Dolan, T.J, "Fusion Research", 1982, vol. II—Experiments, Pergamon Press, New York, pp. 277-309.
Feldbacher, R., et al., "Basic Cross Section Data for Aneutronic Reactor", Nuclear Instruments and Methods in Physics Research A271, 1988, pp. 55-64.
Finn, J.M., et al., "Field-Reversed Configurations With a Component of Energetic Particles", Nuclear Fusion, 1982, vol. 22, No. 11, pp. 1443-1518.
Goldston, R.J., et al., "Fusion Alternatives", Science, 1997, vol. 278, No. 5346, pp. 2031-2037.
Gota, H., et al., A Well-Confined Field-Reversed Configuration Plasma Formed by Dynamic Merging of Two Colliding Compact Toroids in C-2, ICC and CT Workshops, Aug. 16, 2011, retrieved from http://www.iccworkshops.org/icc2011/uploads/241/icc2011_gota_talk_8_16_11.pdf, pp. 1-19.
Guo, H. Y., et al., "Flux Conversion and Evidence of Relaxation in a High-β Plasma Formed by High-Speed Injection into a Mirror Confinement Structure", Phys. Rev. Lett., 2004, vol. 92, No. 24, pp. 245001-1-245001-4.
Guo, H. Y., et al., "Formation of a long-lived hot field reversed configuration by dynamically merging two colliding high-β compact toroids", Physics of Plasmas, 2011, vol. 18, pp. 056110-1-056110-10.
Heidbrink, W.W., et al., "Comparison of Experimental and Theoretical Fast Ion Slowing-Down Times in DIII-D", Nuclear Fusion, 1988, vol. 28, No. 1, pp. 1897-1901.

Heidbrink, W.W., "Measurements of classical deceleration of beam ions in the DIII-D tokamak", Phys. Fluids B. 1990, vol. 2, No. 1, pp. 4-5.
Heidbrink, W.W., et al., "The diffusion of fast ions in Ohmic TFTR discharges", Phys. Fluids B, 1991, vol. 3, No. 11, pp. 3167-3170.
Heidbrink, W.W., et al., "The Behaviour of Fast Ions in Tokamak Experiments", Nuclear Fusion, 1994, vol. 34, No. 4, pp. 535-618.
Himura, H., et al., "Rethermalization of a field-reversed configuration plasma in translation experiments", Phys. Plasmas, 1995, vol. 2, No. 1, pp. 191-197.
Hoffman, A.L., et al., "Field Reversed Configuration Lifetime Scaling Based on Measurements From the Large s Experiment", Nucl. Fusion, 1993, vol. 33, No. 1, pp. 27-38.
Iwanenko, D., et al., "On the Maximal Energy Attainable in a Betatron", Physical Review, 1944, vol. 65, Nos. 11 and 12, p. 343.
Jeffries, C.D., "A Direct Determination of the Magnetic Moment of the Protons in Units of the Nuclear Magneton", Physical Review, 1951, vol. 81, No. 6, pp. 1040-1055.
Jones, I. R., "A review of rotating magnetic field current drive and the operation of the rotamak as a field-reversed configuration (Rotamak-FRC) and a spherical tokamak (Rotamak-ST)", Physics of Plasmas, 1999, vol. 6, No. 5, pp. 1950-1957.
Kalinowsky, H., "Deceleration of antiprotons from MeV to keV energies", Hyperfine Interactions, 1993, vol. 76, pp. 73-80.
Karpushov, A. N., et al., "Upgrade of the TCV tokamak, first phase: Neutral beam heating system", Fusion Engineering and Design, 2015, vol. 96-97, pp. 493-497.
Lampe, M., et al., "Comments on the Colliding Beam Fusion Reactor Proposed by Rostoker, Binderbauer and Monkhorst for Use with the $p-^{11}B$ Fusion Reaction", Naval Research Lab., Plasma Physics Division, Oct. 30, 1998, pp. 1-37.
"Laval nozzle", 1992, Academic Press Dictionary of Science and Technology, retrieved from http://www.credoreference.com/entry/3122475/.
Lawson, J.D., "Some Criteria for a Power Producing Thermonuclear Reactor", Proc. Phys. Soc. B70, 1957, pp. 6-10.
Lifschitz, A.F., et al., "Calculations of tangential neutral beam injection current drive efficiency for present moderate flux FRCs", Nucl. Fusion, 2004, vol. 44, pp. 1015-1026.
Majeski, R., et al., "Enhanced Energy Confinement and Performance in a Low-Recycling Tokamak", Physical Review Letters, 2006, vol. 97, pp. 075002-1-075002-4.
Matsumoto, T., et al., "Development of Compact Toroid Injector for C-2 FRCs", retrieved from https://tae.com/development-of-compact-toroid-injector-for-c-2-frcs/ on Jun. 12, 2018, 1 page.
Miley, G.H., et al., "A possible route to small, flexible fusion units", Energy, 1979, vol. 4, pp. 163-170.
Miley, G.H., et al., "On design and development issues for the FRC and related alternate confinement concepts", Fusion Engineering and Design, 2000, vol. 48, pp. 327-337.
Naitou, H., et al., "Kinetic Effects on the Convective Plasma Diffusion and the Heat Transport", Journal of the Physical Society of Japan, 1979, vol. 46, No. 1, pp. 258-264.
Nevins, W.M., "Feasibility of a Colliding Beam Fusion Reactor", Science, 1998, vol. 281, No. 5375, p. 307.
Okada, S., et al., "Experiments on additional heating of FRC plasmas", Nucl. Fusion, 2001, vol. 41, No. 5, pp. 625-629.
Ono, Y., et al., "New relaxation of merging spheromaks to a field reversed configuration", Nucl. Fusion, 1999, vol. 39, No. 11Y, pp. 2001-2008.
Phelps, D.A., et al., "Observations of the stable equilibrium and classical diffusion of field reversing relativistic electron coils", The Physics of Fluids, 1974, vol. 17, No. 12, pp. 2226-2235.
"Summary", Plasma Science—Advancing Knowledge in the National Interest, National Research Counsel of the National Academies, 2007, the National Academies Press, Washington, D.C., pp. 1-5.
Post, R.F., "Nuclear Fusion", McGraw-Hill Encyclopedia of Science & Technology, $6^{th}$ Edition, 1987, pp. 142-153.
Raman, R., "Fuelling Requirements for Advanced Tokamak operation", 32nd EPS Conference on Plasma Phys. Tarragona, 2005, pp. 1-4.

(56) References Cited

OTHER PUBLICATIONS

Rider, T.H., "A general critique of inertial-electrostatic confinement fusion systems", Physics Plasmas, 1995, vol. 2, No. 6, pp. 1853-1872.
Rider, T.H., "Fundamental limitations on plasma fusion systems not in thermodynamic equilibrium", Physics Plasmas, 1997, vol. 4, No. 4, pp. 1039-1046.
Robinson, Jr., C.A., "Army Pushes New Weapons Effort", Aviation Week & Space Technology, 1978, vol. 109, pp. 42-53.
Romero, J., "Sliding Mode Control of an FRC plasma axial position", 57th Annual Meeting of the APS Division of Plasma Physics, 2015, 1 page.
Rosenbluth, M.N., et al., "Fokker-Planck Equation for an Inverse-Square Force", The Physical Review, 1957, vol. 107, No. 1, pp. 1-6.
Rostoker, N., "Large Orbit Magnetic Confinement Systems for Advanced Fusion Fuels", Final Technical Report, U.S. Dept. of Commerce, National Technical Information Service, Apr. 1, 1990-Feb. 29, 1992, pp. i-80.
Rostoker, N., et al., "Self-Colliding Systems for Aneutronic Fusion", Comments on Plasma Physics and Controlled Fusion, 1992, vol. 15, No. 2, pp. 105-120.
Rostoker, N., et al., "Large Orbit Confinement for Aneutronic Systems", Non-Linear and Relativistic Effects in Plasmids, editor V. Stefan, 1992, American Institute of Physics, New York, pp. 116-135.
Rostoker, N., et al., "Magnetic Fusion with High Energy Self-Colliding Ion Beams", Physical Review Letters, 1993, vol. 70, No. 12, pp. 1818-1821.
Rostoker, N., et al., "Self-Colliding Beams as an Alternative Fusion System", $10^{th}$ International Conference on High Power Particle Beams, San Diego, CA, Jun. 20-24, 1994, pp. 195-201.
Rostoker, N., et al., "Classical Scattering in a High Beta Self-Collider/FRC", AIP Conference Proceedings 311, 1994, Physics of High Energy Particles in Toroidal Systems, Irvine, CA 1993, pp. 168-185.
Rostoker, N., et al., "Self-Colliding Beams as an Alternative Fusion System for D-$He^3$" Reactors, Current Trends in International Fusion Research, edited by Panarella, Plenum Press, New York, 1997, Chapter 4, pp. 33-41.
Rostoker, N., et al., "Alternative Fusion Concepts", Current Trends in International Fusion Research, edited by Panarella, Plenum Press, New York, 1997, Chapter 32, pp. 489-495.
Rostoker, N., et al., "Fusion Reactors Based on Colliding Beams in a Field Reversed Configuration Plasma", Comments on Plasma Physics and Controlled Fusion, 1997, vol. 18, No. 1, pp. 11-23.
Rostoker, N., "Colliding Beam Fusion Reactor", 12th International Conference on High-Power Particle Beams, Proceedings—vol. 1, Jun. 7-12, 1997, Haifa, Israel.
Rostoker, N., et al., "Colliding Beam Fusion Reactor", Science, 1997, vol. 278, No. 5342, pp. 1419-1422.
Rostoker, N., "Advanced Fusion Energy and Future Energy Mix Scenarios", Abstracts with Programs, 1999 Annual Meeting & Exposition, Oct. 25-28, 1999, Denver, CO.
Ruggiero, A.G., "Proton-Boron Colliding Beams for Nuclear Fusion", Proceedings of ICONE 8, $8^{th}$ International Conference on Nuclear Engineering, Apr. 2-6, 2000, Baltimore, MD, pp. 1-11.
Shishlov, A.V., et al., "Long time implosion experiments with double gas puffs", Physics of Plasmas, 2000, vol. 7, No. 4, pp. 1252-1262.
Slough, J.T., et al., "Confinement and Stability of Plasmas in a Field-Reversed Configuration", Physical Review Letters, 1992, vol. 69, No. 15, pp. 2212-2215.
Slough, J.T., et al., "Enhanced Confinement and Stability of a Field-Reversed Configuration with Rotating Magnetic Field Current Drive", Physical Review Letters, 2000, vol. 85, No. 7. pp. 1444-1447.
Smirnov, A., et al., "Neutral Beam Dump Utilizing Cathodic ARC Titanium Evaporation", Fusion Science and Technology, vol. 59, No. 1, 2010, pp. 271-273.
Smirnov, A., et al., "Neutral beam dump with cathodic arc titanium gettering", Rev. Sci. Instr., 2011, vol. 82, pp. 033509-1-033509-6.
Song, Y., et al., "Electron trapping and acceleration in a modified elongated betatron", Phys. Fluids B, 1992, vol. 4, No. 11, pp. 3771-3780.
Speth, E., et al., "Overview of RF Source Development at IPP", CCNB-Meeting at Padua, Jun. 5-6, 2003, pp. 1-29.
Steinhauer, L.C., et al., "FRC 2001: A White Paper on FRC Development in the Next Five Years", Fusion Technology, 1996, vol. 30, No. 1, pp. 116-127.
Tandem Energy Corporation Presentation, Dec. 12, 1997, Washington, D.C., pp. 1-47.
Tomita, Y., et al., "Direct Energy Conversion System for D-$^3$He Fusion", $7^{th}$ International Conference on Emerging Nuclear Energy Systems, ICENES '93, 1994, pp. 522.526.
Tuszewski, M., "Field Reversed Configurations", Nuclear Fusion, 1988, vol. 28, No. 11, pp. 2033-2092.
Tuszewski, M., "Status of the Field-Reversed Configuration as an Alternate Confinement Concept", Fusion Technology, 1989, vol. 15, No. 11, pp. 1148-1153.
Tuszewski, M., et al. "Combined FRC and mirror plasma studies in the C-2 device", Fusion Science and Technology, 2011, vol. 59, No. 1, pp. 23-26.
Vinyar, I., et al., "Pellett Injectors Developed at PELIN for JET, TAE, and HL-2A", Fusion Engineering and Design, 2011, vol. 86, pp. 2208-2211.
Watanabe, T., et al., "Computation of Neutral Gas Flow Generation From a CT Neutralization Fuel-Injector", Plasma and Fusion Research: Regular Articles, 2012, vol. 7, pp. 2405042-1-2405042-4.
Ware, A.A., et al., "Electrostatic Plugging of Open-Ended Magnetic Containment Systems", Nuclear Fusion, 1969, vol. 9, No. 4, pp. 353-361.
Weaver, T., et al., "Exotic CTR Fuels For Direct Conversion-Utilizing Fusion Reactors", Talk before the AEC CTR Staff, Mar. 16, 1973, AEC/Germantown.
Weaver, T., et al., "Fusion Microexplosions, Exotic Fusion Fuels, Direct Conversion: Advanced Technology Options for CTR", Annual Meeting of the Committee on Advance Development and the Fusion Task Force of the Edison Electric Institute, Apr. 27, 1973, Los Alamos Scientific Laboratory, CA.
Weaver, T., et al., "Exotic CTR Fuels: Non-Thermal Effects and Laser Fusion Applications", 1973 Annual Meeting of the American Physical Society Division of Plasma Physics, Oct. 31-Nov. 3, 1973, Philadelphia, PA, pp. 1-12.
"Welcome to Colliding Beam Fusion", retrieved from http://fusion.ps.uci.edu/beam/introb.html on Oct. 11, 2000, pp. 1-3.
Wells, D. R., "Injection and Trapping of Plasma Vortex Structures", Phys. Fluids, 1966, vol. 9, No. 5, pp. 1010-1021.
Wessel, F.J., et al., "D-T Beam Fusion Reactor", Journal of Fusion Energy, 1998, vol. 17, No. 3, pp. 209-211.
Wessel, F.J., et al., "Colliding Beam Fusion Reactor Space Propulsion System", AIP Conference Proceedings 504, 2000, pp. 1425-1430.
"A White Paper on FRC Development", Apr. 1998, retrieved from http://depts.washington.edu/rppl/programs/wpr98.pdf, pp. 1-26.
Wong, H.V., et al., "Stability of annular equilibrium of energetic large orbit ion beam", Phys. Fluids B, 1991, vol. 3, No. 11, pp. 2973-2986.
Zweben, S.J., et al., "Radial Diffusion Coefficient for Counter-Passing MeV Ions in the TFTR Tokamak", Nuclear Fusion, 1991, vol. 31, No. 12, pp. 2219-2245.
Hsu, S.C., "Technical Summary of the First U.S. Plasma Jet Workshop", J Fusion Energy, 2009, vol. 28, pp. 246-257.
Matsumoto, T., et al., "Development of a magnetized coaxial plasma gun for compact toroid injection into the C-2 field-reversed configuration device", Review of Scientific Instruments, 2016, vol. 87, pp. 053512-1-053512-6.
Belova, E. V., et al., "Oblate FRC concept with NBI for experimental studies of large-s FRC formation, stability, current drive and transport", White Paper for ReNeW theme 5 Workshop, 2009, 3 pages.

(56) References Cited

OTHER PUBLICATIONS

Binderbauer, M.W., et al., "A high performance field-reversed configuration", Physics of Plasmas, 2015, vol. 22, pp. 056110-1-056110-16.
Gota, H., et al., "Overview of C-2U Field-Reversed Configuration Experiments", Exploratory Plasma and Fusion Science Research Workshop, Auburn, Alabama, Feb. 25, 2016, retrieved from http://www.iccworkshops.org/epr2016/uploads/455/epr2016_hgota_2_25_16.pdf on Apr. 25, 2019, pp. 1-31.
Homfray, D. A., et al., "Real time neutral beam power control on MAST", Fusion Engineering and Design, 2011, vol. 86, pp. 780-784.
Itagaki, H., et al., "Mitigation of rotational instability of high-beta field-reversed configuration by double-sided magnetized plasmoid injection", Physics of Plasma, 2014, vol. 21, pp. 030703-1-030703-3.
Neyatani, Y., et al., "Feedback control of neutron emission rate in JT-60U", Fusion Engineering and Design, 1997, vol. 36, pp. 429-433.
Witherspoon, F. D., et al., "A contoured gap coaxial plasma gun with injected plasma armature", Rev. Sci. Instrum., 2009, vol. 80, pp. 083506-1-083506-15.
EP, 19210201.0 Extended Search Report, dated Jan. 22, 2020.
Howard, S., et al., "Development of Merged Compact Toroids for Use as a Magnetized Target Fusion Plasma", Journal of Fusion Energy, 2009, vol. 2 7, pp. 156-161.
Woodruff, S., et al., "Adiabatic Compression of a Doublet Field Reversed Configuration", Journal of Fusion Energy, 2008, vol. 27, No. 1, pp. 128-133.

\* cited by examiner

SYSTEMS AND METHODS FOR MERGING AND COMPRESSING COMPACT TORI

CROSS-REFERENCE TO RELATED APPLICATIONS

The subject application is a continuation of U.S. patent application Ser. No. 16/862,044, filed Apr. 29, 2020, which is a continuation of U.S. patent application Ser. No. 16/277,441, filed Feb. 15, 2019, now U.S. Pat. No. 10,665,351, which is a continuation of U.S. patent application Ser. No. 15/483,984, filed Apr. 10, 2017, now U.S. Pat. No. 10,217,532, which is a continuation of PCT Patent Application No. PCT/US15/55172, filed Oct. 12, 2015, which claims priority to U.S. Provisional Patent Application No. 62/064,346, filed on Oct. 15, 2014, and U.S. Provisional Patent Application No. 62/063,382, filed on Oct. 13, 2014, all of which are incorporated by reference herein in their entirety for all purposes.

FIELD

The embodiments described herein relate generally to pulsed plasma systems and, more particularly, to systems and methods that facilitate merging and compressing compact tori with superior stability as well as significantly reduced losses and increased efficiency.

BACKGROUND INFORMATION

The Field Reversed Configuration (FRC) belongs to the class of magnetic plasma confinement topologies known as compact toroids. It exhibits predominantly poloidal magnetic fields and possesses zero or small self-generated toroidal fields (see M. Tuszewski, Nucl. Fusion 28, 2033 (1988)). The attractions of such a configuration are its simple geometry for ease of construction and maintenance, a natural unrestricted divertor for facilitating energy extraction and ash removal, and very high average (or external) β (β is the ratio of the average plasma pressure to the average magnetic field pressure inside the FRC), i.e., high power density. The β metric is also a very good measure of magnetic efficiency. A high average β value, e.g. close to 1, represents efficient use of the deployed magnetic energy and is henceforth essential for the most economic operation. High average β is also critically enabling the use of aneutronic fuels such as $D-He^3$ and $p-B^{11}$.

The traditional method of forming an FRC uses the field-reversed θ-pinch technology, producing hot, high-density plasmas (see A. L. Hoffman and J. T. Slough, Nucl. Fusion 33, 27 (1993)). A variation on this is the translation-trapping method in which the plasma created in a theta-pinch "source" is more-or-less immediately ejected out of the formation region and into a confinement chamber. The translating plasmoid is then trapped between two strong mirrors at the ends of the confinement chamber (see, for instance, H. Himura, S. Okada, S. Sugimoto, and S. Goto, Phys. Plasmas 2, 191 (1995)). Once in the confinement chamber, various heating and current drive methods may be applied such as beam injection (neutral or neutralized), rotating magnetic fields, RF or ohmic heating, etc. This separation of source and confinement functions offers key engineering advantages for potential future fusion reactors. FRCs have proved to be extremely robust, resilient to dynamic formation, translation, and violent capture events. Moreover, they show a tendency to assume a preferred plasma state (see e.g. H. Y. Guo, A. L. Hoffman, K. E. Miller, and L. C. Steinhauer, Phys. Rev. Lett. 92, 245001 (2004)). Significant progress has been made in the last decade developing other FRC formation methods: merging spheromaks with oppositely-directed helicities (see e.g. Y. Ono, M. Inomoto, Y. Ueda, T. Matsuyama, and T. Okazaki, Nucl. Fusion 39, 2001 (1999)) and by driving current with rotating magnetic fields (RMF) (see e.g. I. R. Jones, Phys. Plasmas 6, 1950 (1999)), which also provides additional stability.

FRCs consist of a torus of closed field lines inside a separatrix, and of an annular edge layer on the open field lines just outside the separatrix. The edge layer coalesces into jets beyond the FRC length, providing a natural divertor. The FRC topology coincides with that of a Field-Reversed-Mirror plasma. However, a significant difference is that the FRC plasma can have an internal β of about 10. The inherent low internal magnetic field provides for a certain indigenous kinetic particle population, i.e. particles with large larmor radii, comparable to the FRC minor radius. It is these strong kinetic effects that appear to at least partially contribute to the gross stability of past and present FRCs, such as those produced in the recent collision-merging experiments.

The collision-merging technique, proposed long ago (see e.g. D. R. Wells, Phys. Fluids 9, 1010 (1966)) has been significantly developed further: two separate theta-pinches at opposite ends of a confinement chamber simultaneously generate two plasmoids (e.g., two compact tori) and accelerate the plasmoids toward each other at high speed; they then collide at the center of the confinement chamber and merge to form a compound FRC. In the construction and successful operation of one of the largest FRC experiments to date, the conventional collision-merging method was shown to produce stable, long-lived, high-flux, high temperature FRCs (see e.g. M. Binderbauer, H. Y. Guo, M. Tuszewski et al., Phys. Rev. Lett. 105, 045003 (2010), which is incorporated herein by reference). In a related experiment, the same team of researchers combined the collision-merging technique with simultaneous axial acceleration and radial compression to produce a high density transient plasma in a central compression chamber (see V. Bystritskii, M. Anderson, M. Binderbauer et al., Paper P1-1, IEEE PPPS 2013, San Francisco, CA (hereinafter "Bystritskii"), which is incorporated herein by reference). This latter experiment reported in Bystritskii utilized a multitude of acceleration and compression stages before final collisional merging and represents a precursor concept to the system subject to this patent application.

In contrast to the embodiments described here, the precursor system described in Bystritskii featured simultaneous compression and acceleration of compact tori within the same stage by using active fast magnetic coils. Five such stages were deployed on either side of a central compression chamber before magnetically compressing the merged compact tori. While the precursor experiment achieved respectable performance, it exhibited the following deficiencies: (1) Simultaneous compression and acceleration led to inefficient use of driver energy deployed for magnetic compression due to a timing mismatch; (2) Temperature and density decreased as plasma expanded during transit between sections; (3) Abrupt transitions between adjacent sections led to large losses due to plasma-wall contact and generation of shockwaves.

Aside from the fundamental challenge of stability, pulsed fusion concepts in the medium density regime will have to address adequate transport timescales, efficient drivers, rep-rate capability and appropriate final target conditions. While the precursor system has successfully achieved stable single discharges at encouraging target conditions, the collective losses between formation and final target parameters (presently about 90% of the energy, flux, and particles) as well as the coupling efficiency between driver and plasma (at present around 10-15%) need to be substantially improved.

In light of the foregoing, it is, therefore, desirable to provide improved systems and methods for pulsed fusion concepts that facilitate a significant reduction of translation and compression losses and an increase in driver efficiency.

SUMMARY

The present embodiments provided herein are directed to systems and methods that facilitate merging and compressing compact tori with superior stability as well as a significant reduction of translation and compression losses and an increase in coupling efficiency between drivers and plasma. Such systems and methods provide a pathway to a whole variety of applications including compact neutron sources (for medical isotope production, nuclear waste remediation, materials research, neutron radiography and tomography), compact photon sources (for chemical production and processing), mass separation and enrichment systems, and reactor cores for fusion for the future generation of energy and for fusion propulsion systems.

The systems and methods described herein are based on the application of successive, axially symmetric acceleration and adiabatic compression stages to accelerate and heat two compact tori towards each other and ultimately collide and fast magnetically compress the compact tori within a central compression chamber.

In certain embodiments, a system for merging and compressing compact tori comprises a staged symmetric sequence of compact tori formation, axial acceleration by fast active magnetic coils, passive adiabatic compression by way of a conically constricting flux conserver, and ultimately merging of the compact tori and final fast magnetic compression in a central compression chamber. The intermediate steps of sufficient axial acceleration followed by adiabatic compression can be repeated multiple times to achieve adequate target conditions before merging and final compression. In this way, a reactor can be realized by adding further sections to the system.

The formation and accelerations stages or sections and the central compression chamber are preferably cylindrically shaped with walls formed of non-conducting or insulating material such as, e.g., a ceramic. The compressions stages or sections are preferably trunco-conically shaped with walls formed from conducting material such as, e.g., a metal.

Aside from a magnetic bias field (DC guide field) supplied by slow coils, the formation sections, the acceleration sections, and the compression chamber include modular pulsed power systems that drive fast active magnetic coils. The pulsed power systems enable compact tori to be formed in-situ within the formation sections and accelerated and injected (=static formation) into the first compression sections, accelerated in the acceleration sections and injected into the next compression sections, and so on, and then be magnetically compressed in the compression chamber. The slow or DC magnetic coil systems located throughout and along the axis of the system provide an axial magnetic guide field to center the compact tori appropriately as it translates through the section toward the mid-plane of the central compression chamber.

Alternatively, the modular pulsed power systems of the formation sections can also drive the fast active magnetic coils in a way such that compact tori are formed and accelerated simultaneously (=dynamic formation).

The systems and methods described herein deploy FRCs, amongst the highest beta plasmas known in magnetic confinement, to provide the starting configuration. Further passive and active compression builds on this highly efficient magnetic topology. The process of using axial acceleration via active fast magnet sections followed by adiabatic compression in simple flux conserving conic sections provides for the most efficient transfer of energy with the least complex pulsed power circuitry. Furthermore, these basic building blocks can be sequenced to take additional advantage of the inherently favorable compressional scaling, i.e. $\Delta p \propto R^4$.

In another embodiment, the system is configured to deploy spheromaks instead of FRC starter plasmas.

In another embodiment, the system comprises a staged asymmetric sequence from a single side of the central compression chamber comprising compact tori formation, axial acceleration by fast active magnetic coils, passive adiabatic compression by way of a conically constricting flux conserver, and ultimately merging of the compact tori and final fast magnetic compression in the central compression chamber. Such an asymmetric system would include a mirror or bounce cone positioned adjacent the other side of the central compression.

In yet another embodiment, the system comprises a thin cylindrical shell or liner comprised of conductive material such as, e.g., a metal, for fast liner compression within the central compression chamber.

Other systems, methods, features and advantages of the example embodiments will be or will become apparent to one with skill in the art upon examination of the following figures and detailed description.

BRIEF DESCRIPTION OF THE FIGURES

The accompanying drawings, which are included as part of the present specification, illustrate the presently preferred embodiment and, together with the general description given above and the detailed description of the preferred embodiment given below, serve to explain and teach the principles of the present invention.

Figure 1:
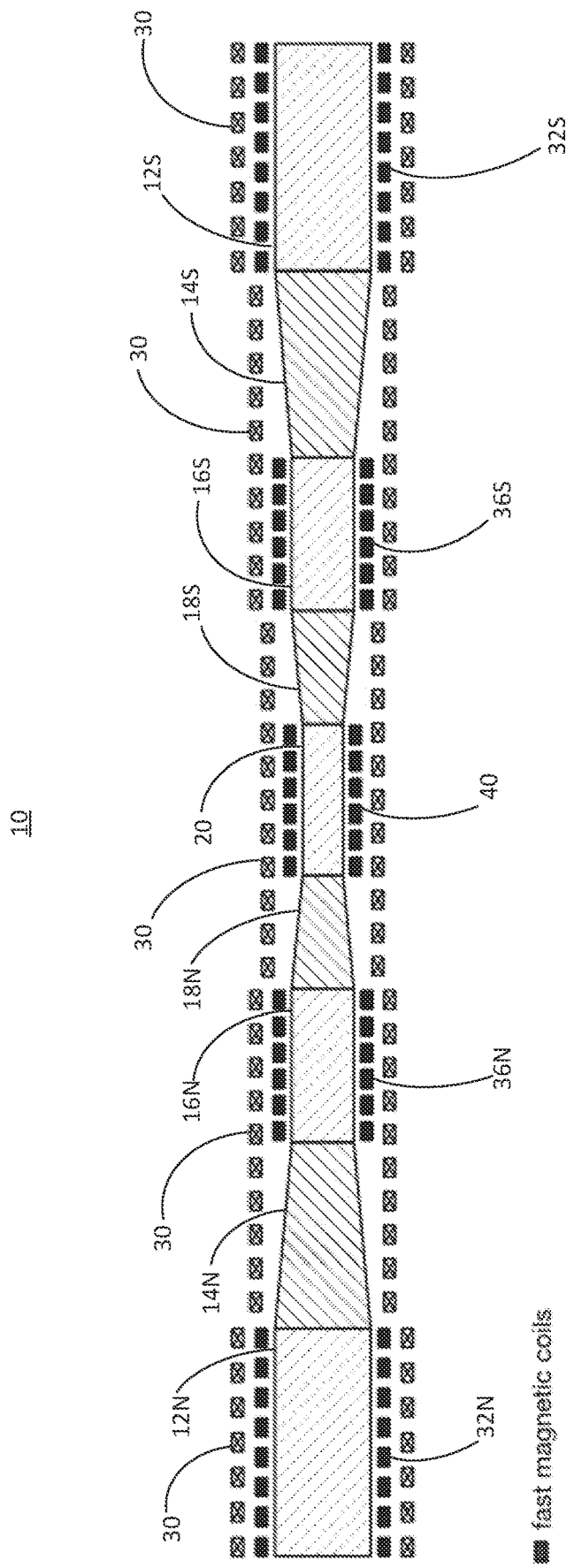
FIG. 1 illustrates a basic layout of a system for forming, accelerating, adiabatically compressing, merging and finally magnetically compressing compact tori.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not necessarily describe every aspect of the teachings disclosed herein and do not limit the scope of the claims.

DESCRIPTION

The present embodiments provided herein are directed to systems and methods that facilitate merging and compressing compact tori with superior stability as well as a significant reduction of translation and compression losses and an increase in coupling efficiency between drivers and plasma. Such systems and methods provide a pathway to a whole variety of applications including compact neutron sources (for medical isotope production, nuclear waste remediation, materials research, neutron radiography and tomography), compact photon sources (for chemical production and processing), mass separation and enrichment systems, and reactor cores for fusion for the future generation of energy and for fusion propulsion systems.

The systems and methods described herein are based on the application of successive, axially symmetric acceleration and adiabatic compression stages to accelerate and heat two compact tori towards each other and ultimately collide and fast magnetically compress the compact tori within a central compression chamber. FIG. 1 illustrates the basic layout of a system 10 for forming, accelerating, adiabatically compressing, merging and finally magnetically compressing the compact tori.

As depicted, the system comprises a staged symmetric sequence of compact tori formation in formation sections 12N and 12S, axial acceleration through sections 12N, 12S, 16N and 16S by fast active magnetic coils 32N, 32S, 36N and 36S, passive adiabatic compression by way of a conically constricting flux conserver in sections 14N, 14S, 18N and 18S, and ultimately merging of the compact tori and final fast magnetic compression in a central compression chamber 20 by fast active magnetic coils 40. As illustrated, the intermediate steps of sufficient axial acceleration followed by adiabatic compression can be repeated multiple times to achieve adequate target conditions before merging and final compression. In this way, a reactor can be realized by adding further sections to the depicted system.

As depicted the formation and accelerations stages or sections 12N, 12S, 16N and 16S and the central compression chamber 20 are preferably cylindrically shaped with walls formed of non-conducting or insulating material such as, e.g., a ceramic. The compressions stages or sections 14N, 14S, 18N and 18S are preferably trunco-conically shaped with walls formed from conducting material such as, e.g., a metal.

Aside from a magnetic bias field (DC guide field) supplied by slow passive coils 30, the formation sections 12N and 12S, the acceleration sections 16N and 16S, and the compression chamber 20 include modular pulsed power systems that drive fast active magnetic coils 32N, 32S, 36N, 36S and 40. The pulsed power systems enable compact tori to be formed in-situ within the formation sections 12N and 12S and accelerated and injected (=static formation) into the first compression sections 14N and 14S, accelerated in the acceleration sections 16N and 16S and injected into the next compression sections 18N and 18S, and so on, and then be magnetically compressed in the compression chamber 20. The slow passive magnetic coil systems 30 located throughout and along the axis of the system provide an axial magnetic guide field to center the compact tori appropriately.

Alternatively, the modular pulsed power systems of the formation sections can also drive the fast magnetic coils in a way such that compact tori are formed and accelerated simultaneously (=dynamic formation).

The systems and methods described herein deploy FRCs, amongst the highest beta plasmas known in magnetic confinement, to provide the starting configuration. Further passive and active compression builds on this highly efficient magnetic topology. The process of using axial acceleration via active fast magnet sections followed by adiabatic compression in simple flux conserving conic sections provides for the most efficient transfer of energy with the least complex pulsed power circuitry. Furthermore, these basic building blocks can be sequenced to take additional advantage of the inherently favorable compressional scaling, i.e. $\Delta p \propto R^4$.

Based on experimental and theoretical research to date, a precursor experiment as describe by Bystritskii, using FRC starter plasmas has achieved densities of about $10^{17}$ cm$^{-3}$ at 1 keV. The embodiments proposed herein are estimated to reach densities of about $10^{18}$ cm$^{-3}$ at 1 keV, while adding further stages and appropriate upgrades to the central chamber and fast magnetic coils can yield ultimate densities of about $10^{18}$ cm$^{-3}$ at full Lawson conditions.

In another embodiment, the system is configured to deploy spheromaks instead of FRC starter plasmas.

In another embodiment, the system comprises a staged asymmetric sequence from a single side of the central compression chamber comprising compact tori formation, axial acceleration by fast active magnetic coils, passive adiabatic compression by way of a conically constricting flux conserver, and ultimately merging of the compact tori and final fast magnetic compression in the central compression chamber. Such an asymmetric system would include a mirror or bounce cone.

In yet another embodiment, the system comprising a thin cylindrical shell or liner comprised of conductive material such as, e.g., a metal, for fast liner compression within the central compression chamber.

Fusion concepts today are focused on either steady state or ultra-short pulsed regimes. Both approaches require large capital investment: in steady state magnetic fusion, high expense arises from large superconducting magnets and auxiliary heating/current drive technologies; inertial regimes are dominated by high driver cost due to large energy delivery over nanosecond timescales. The embodiments advanced herein are characterized by compact size and sub-millisecond time scales. This leads to a regime that has relaxed peak power requirements and attractive intermediate time scales.

Turning in detail to the drawings, as depicted in FIG. 1, a system 10 for merging and compressing compact tori plasma includes a central compression chamber 20 and a pair of north and south diametrically opposed compact tori formation sections 12N and 12S. The first and second formation sections 12N and 12S include a modularized formation and acceleration systems 120 (discuss below in detail with regard to see FIGS. 2-4) for generating first and second compact plasma tori and axially accelerating and translating the compact tori towards a mid-plane of the compression chamber 20.

As depicted, the system 10 further includes a first pair of north and south diametrically opposed compression sections 14N and 14S coupled on a first end to an exit end of the north and south formation sections 12N and 12S. The north and south compression sections 14N and 14S being configured to adiabatically compress the compact tori as the compact tori traverse the north and south compression sections 14N and 14S towards the mid-plane of the compression chamber 20.

As depicted, the system 10 further includes a pair of north and south diametrically opposed acceleration sections 16N and 16S coupled on a first end to a second end of the first pair of north and south compression sections 14N and 14S. The north and south acceleration section 16N and 16S include modularized acceleration systems (discussed below with regard to FIGS. 2-4) for axially accelerating and translating the compact tori towards the mid-plane of the compression chamber 20.

As further depicted, the system 10 further includes a second pair of north and south diametrically opposed compression sections 18N and 18S coupled on a first end to a second end of the north and south acceleration sections 16N and 16S and on a second end to first and second diametrically opposed ends of the compression chamber, the second pair of north and south compression sections 18N and 18S being configured to adiabatically compress the compact tori as the compact tori traverse the second pair of north and south compression sections 18N and 18S towards the mid-plane of the compression chamber 20.

The compression chamber includes a modularized compression system configured to magnetically compress the compact tori upon collision and merger thereof.

As depicted the north and south formation sections 12N and 12S, the north and south acceleration sections 16N and 16S and the compression chamber 20 are cylindrically shaped. The diameter of the north and south acceleration sections 16N and 16S is smaller than the diameter of the north and south formation sections 12N and 12S, while the diameter of the compression chamber 20 is than the diameter of the north and south acceleration sections 16N and 16S.

The first and second pairs of north and south compression sections 14N, 14S, 18N and 18S are truncated conically shaped with their diameter being larger on a first end than on a second end enabling a transition in the overall diameter of the system 10 from the formation sections 12N and 12S to the acceleration sections 16N and 16S to the compression chamber 20. As depicted, the north and south formation sections 12N and 12S, the first pair of north and south compression sections 14N and 14S, the north and south acceleration sections 16N and 16S, and the second pair of north and south compression sections 18N and 18S are axially symmetric.

As depicted, first and second sets of a plurality of active magnetic coils 32N and 32 are disposed about and axially along the north and south formation sections 12N and 12S, third and fourth sets of a plurality of active magnetic coils 36N and 36S are disposed about and axially along the north and south acceleration sections 16N and 16S, and a fifth set of a plurality of active magnetic coils 40 are disposed about and axially along the compression chamber 20.

The compression sections 14N, 14S, 18N and 18S are preferably formed from conducting material such as, e.g., a metal, while the central compression chamber 20 and the formation and acceleration sections are 12N, 12S, 16N and 16S are preferably formed from non-conducting or insulating material such as, e.g., a ceramic.

As depicted, a plurality of DC magnetic coils 30 are disposed about and axially along the central compression chamber 20 and the formation, compression and acceleration sections 12N, 12S, 14N, 14S, 16N, 16S, 18N and 18S to form a bias or DC guide field within and extending axially through the central compression chamber and the formation, compression and acceleration sections.

Figure 2:
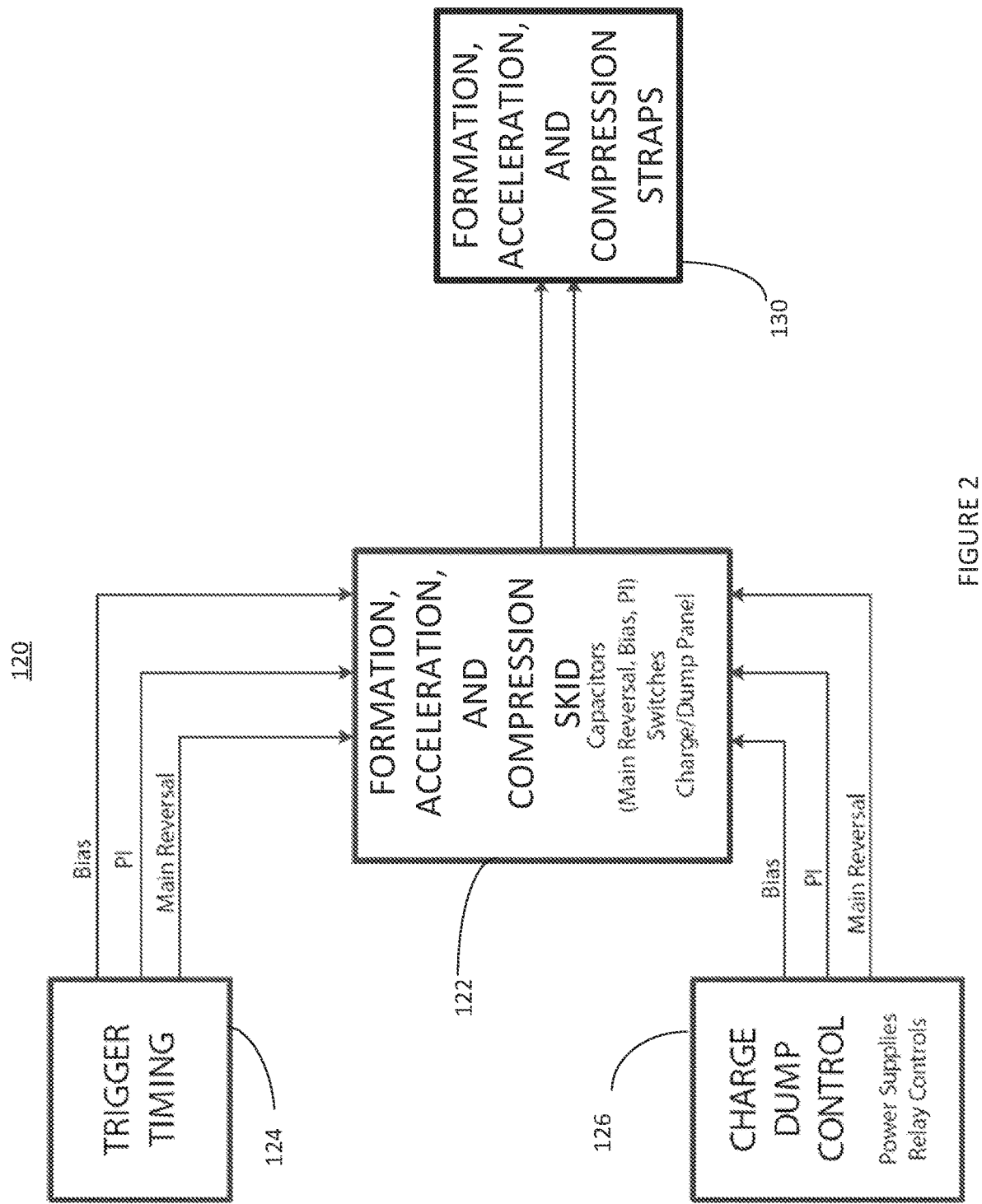
FIG. 2 illustrates a schematic of the components of a pulsed power system for the formation and acceleration sections.
Figure 3:
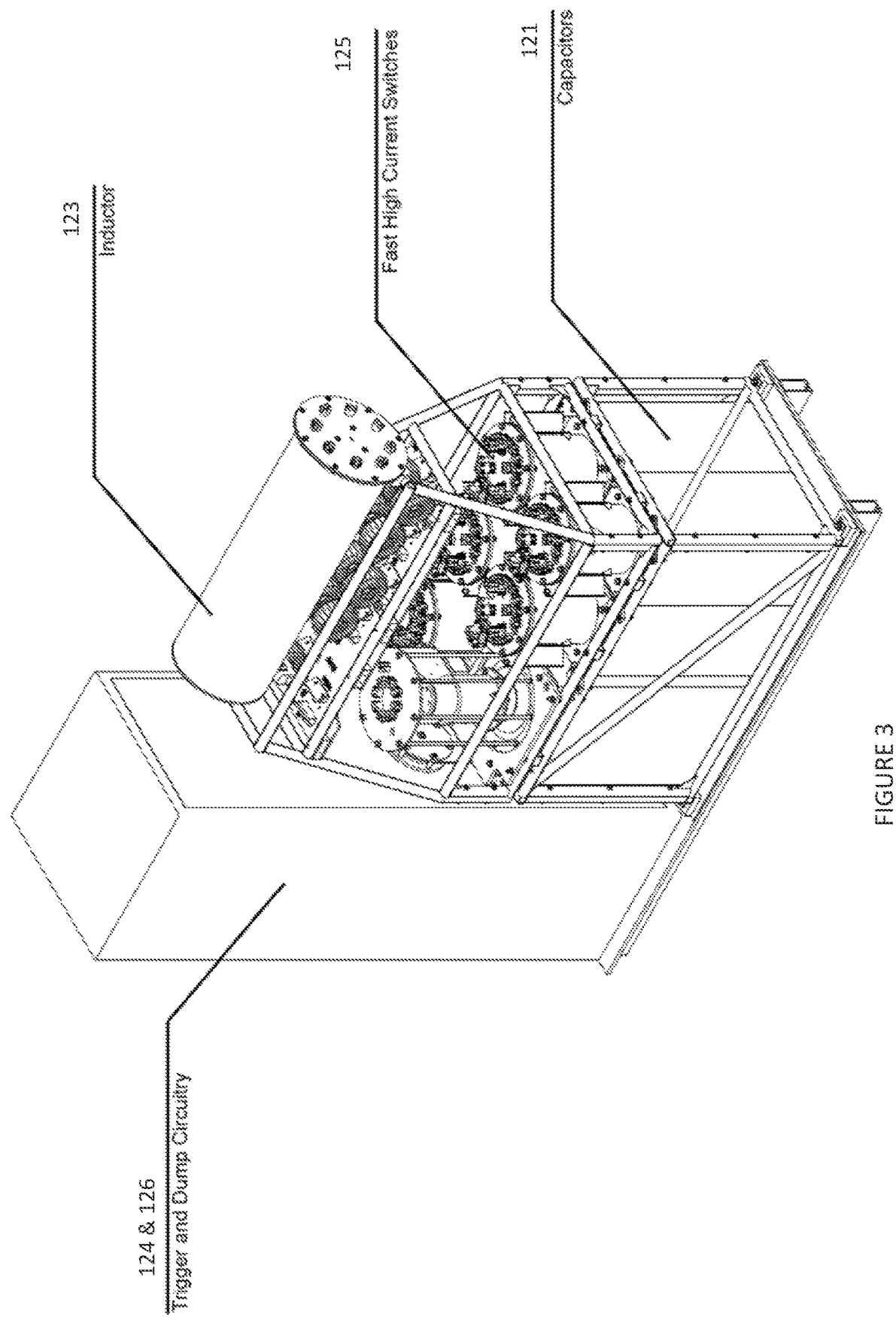
FIG. 3 illustrates an isometric view of an individual pulsed power formation and acceleration skid.
Figure 4:
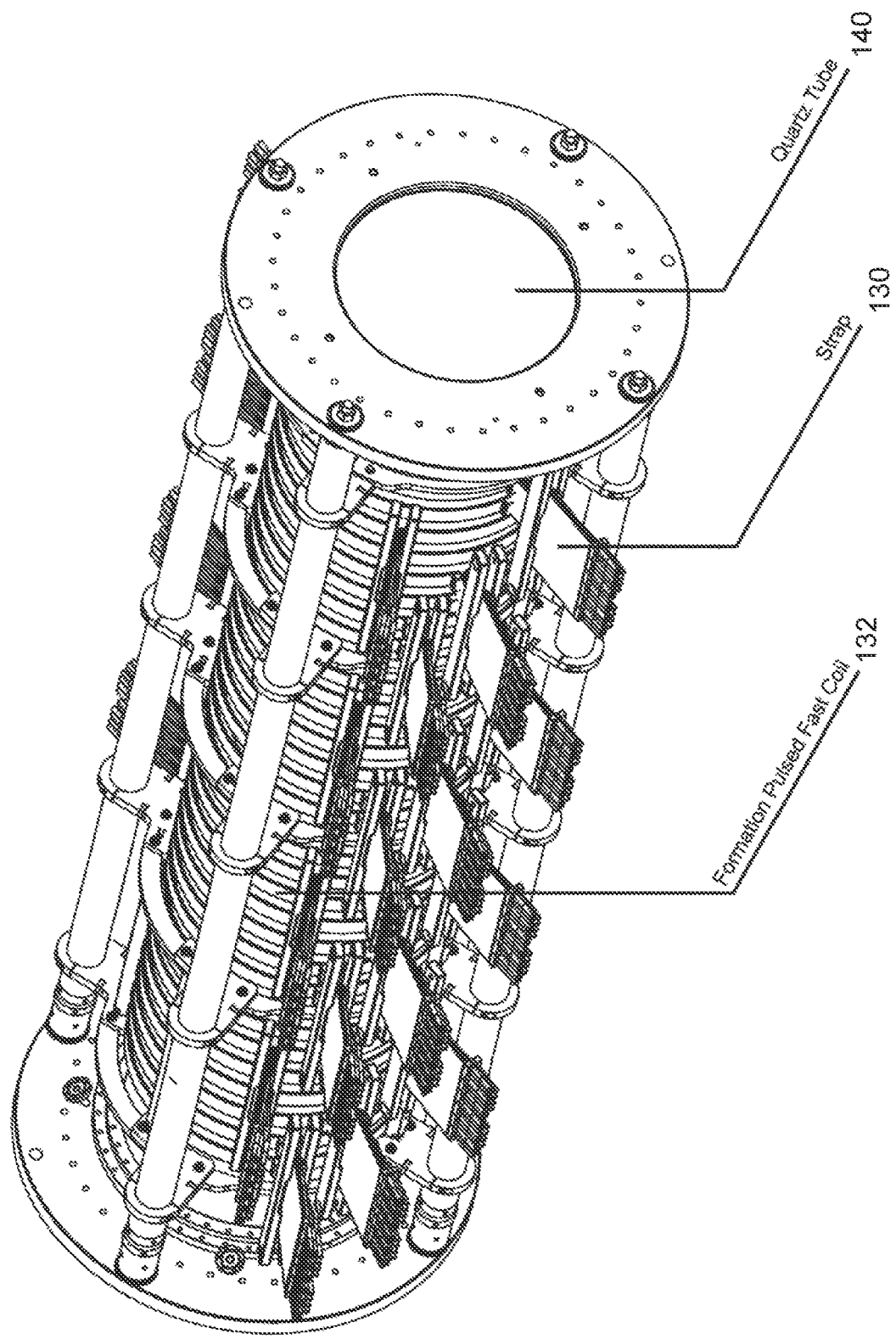
FIG. 4 illustrates an isometric view of a formation and acceleration tube assembly.

Triggering control and switch systems 120, shown in FIGS. 2-4, are configured to enable a staged symmetric sequence of compact tori formation by active magnetic coils 32N and 32S in the north and south formation sections 12N and 12S, axial acceleration by active magnetic coils 36N and 36S in the north and south acceleration sections 16N and 16S, and compression by active magnetic coils 40 in the compression chamber 20. The triggering control and switch systems 120 are configured to synchronize compact tori formation and acceleration in the north and south formation sections 12N and 12S, compact tori acceleration in the north and south acceleration sections 16N and 16S, and compact tori merge and compression in the compression chamber 20.

Turning to FIGS. 2-4, there is individual pulsed power system 120 corresponding to and powering individual ones of the first, second, third, fourth and fifth sets of the plurality of active magnets 32N, 32S, 36N, 36S and 40 of the formation sections 12N and 12S, the acceleration sections 16N and 16S, and the compression chamber 20. In the formation sections, the pulse power system 120 operates on a modified theta-pinch principle to form the compact tori. FIGS. 2 through 4 illustrate the main building blocks and arrangement of the pulsed power systems 120. The pulsed power system 120 is composed of a modular pulsed power arrangement that consists of individual units (=skids) 122 that each energize a sub-set of coils 132 of a strap assembly 130 (=straps) that wrap around the section tubes 140. Each skid 122 is composed of capacitors 121, inductors 123, fast high current switches 125 and associated trigger 124 and dump circuitry 126. Coordinated operation of these components is achieved via a state-of-the-art trigger and control system 124 and 126 that allows synchronized timing between the pulsed power systems 120 on each of the formation sections 12N and 12S, the acceleration sections 16N and 16S, and compression chamber 20, and minimizes switching jitter to tens of nanoseconds. The advantage of this modular design is its flexible operation. In the formation sections 12N and 12S, FRCs can be formed in-situ and then accelerated and injected (=static formation) or formed and accelerated at the same time (=dynamic formation).

In operation, a DC guide field is generated by the passive coils 30 within and axially extending through the compression chamber 20, the formation sections 12N and 12S, the acceleration sections 16N and 16S, and the compression sections 14N, 14S, 18N and 18S. Compact tori are then formed and accelerated in a staged symmetric sequence within the formation sections 12N and 12S and the acceleration sections 16N and 16S towards a mid-plane of the central chamber 20, passively adiabatically compressed within the compression sections 14N, 14S, 18N and 18S, and merged and magnetically compressed within the central chamber 20. These steps of forming, accelerating and compressing compact tori results in the compact tori colliding and merging within the central chamber 20.

The compact tori are formed and accelerated by powering active magnetic coils 32N and 32S extending about and axially along the formation sections 12N and 12S, further accelerated by powering active magnetic coils 35N and 36S extending about and axially along the acceleration sections 16N and 16S, and compressed by powering active magnetic coils 40 extending about and axially along the compression chamber 20. The steps of forming, accelerating and compressing the compact tori further comprises synchronously firing diametrically opposed pairs of active magnetic coils 32N and 32S, and 36N and 36S positioned about and along the formation 12N and 12S and acceleration sections 16N and 16S, and a set of active magnetic coils 40 positioned about and along the compression chamber 20.

As the compact tori are accelerated towards the mid-plane of the compression chamber 20, the compact tori are compressed as the compact tori translate through the conically constricting flux conservers of the compression stages 14N, 14S, 18N and 18S.

Figure 5:
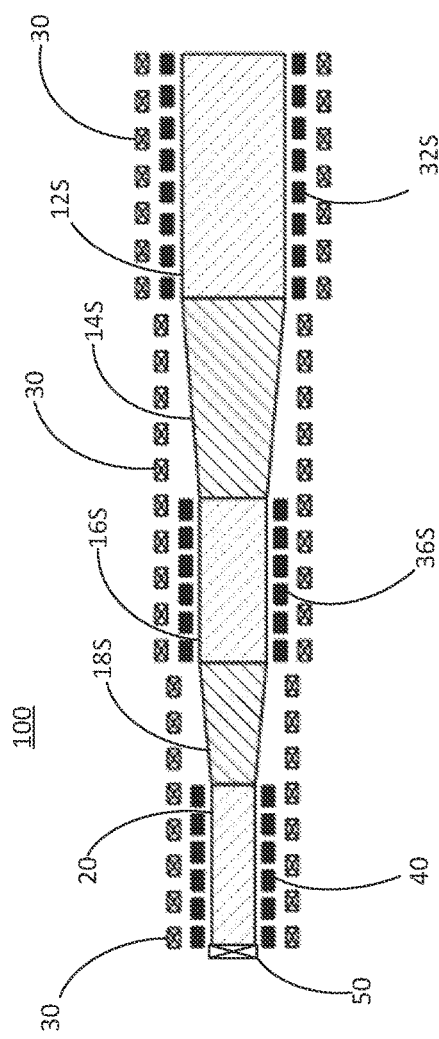
FIG. 5 illustrates a basic layout of an alternate embodiment of an asymmetric system for forming, accelerating, adiabatically compressing, merging and finally magnetically compressing compact tori.

Turning to FIG. 5, an alternative embodiment of a system 100 for merging and compressing compact tori plasma is illustrated. As depicted, the system 100 comprises a staged asymmetric sequence from a single side of the central compression chamber 20. The system 100 includes a single compact toroid formation section 12S, a first compression section 14S coupled on a first end to an exit end of the formation section 12S, an acceleration section 16N coupled on a first end to a second end of the compression section 14S, a second compression section 18S coupled on a first end to a second end of the acceleration section 16S and on a second end to a first end of the compression chamber 20. A mirror or bounce cone 50 is positioned adjacent the other end of the central compression 20.

In operation, a first compact toroid is formed and accelerated in a staged sequence within the formation section 12S and then accelerated in one or more acceleration stages 16S towards a mid-plane of the central chamber 20 to collide and merge with a second compact toroid. The first compact toroid is passively adiabatically compressed within one or more compression stages 14S and 18S, and then magnetically compressed as a merged compact toroid with the second compact toroid within the central chamber 20.

The second compact toroid in formed and accelerated in a staged sequence within the formation section 12S and the one or more acceleration stages 16S towards a mid-plane of the central chamber 20, passively adiabatically compressed within the one or more compression stages, and then biased back toward the mid-plane of the central chamber 20 as it passes through the central chamber 20 with a mirror or bounce cone 50 positioned adjacent an end of the central chamber 20.

Figure 6:
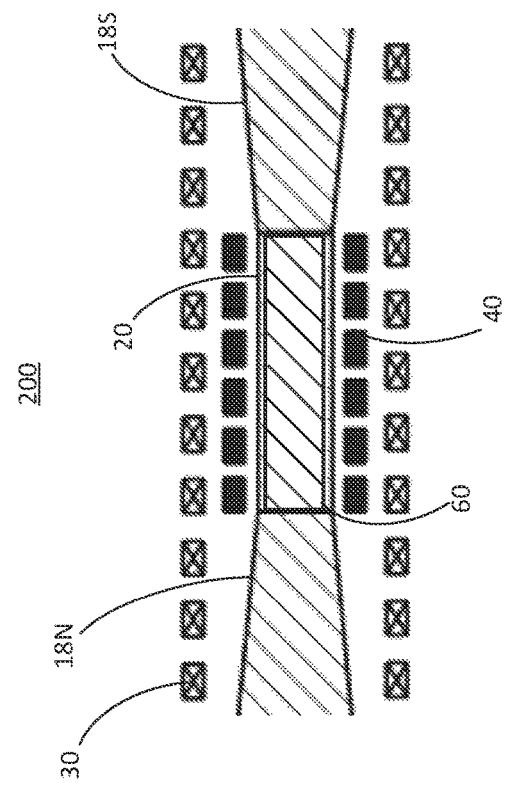
FIG. 6 illustrates a detailed view of the system shown in FIG. 1 modified to include a shell or liner positioned within the central compression chamber for fast liner compression within the central compression chamber.

Turning to FIG. 6, an alternative embodiment of a system 200 for merging and compressing compact tori plasma is illustrated in a partial detail view showing the compression chamber 20 with diametrically opposed compression section 18N and 18S coupled to opposing sides of the chamber 20. The system 200 further comprise a cylindrical shell or liner 60 positioned within the central compression chamber 20 for fast liner compression.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

In the description above, for purposes of explanation only, specific nomenclature is set forth to provide a thorough understanding of the present disclosure. However, it will be apparent to one skilled in the art that these specific details are not required to practice the teachings of the present disclosure.

The various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter.

Systems and methods for merging and compressing compact tori have been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art. For example, the reader is to understand that the specific ordering and combination of process actions described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A system for merging and compressing compact tori plasma comprising
    a central chamber,
    first and second diametrically opposed compact tori plasma formation sections, the first and second formation sections comprising modularized formation and acceleration systems for generating first and second compact tori plasma and axially accelerating the compact tori plasma and translating the compact tori plasma towards a mid-plane of the compression chamber,
    first and second diametrically opposed compression sections coupled on a first end to an exit end of the first and second formation sections, and on a second end to first and second diametrically opposed ends of the central chamber, the first and second compression sections being configured to compress the compact tori plasma as the compact tori plasma traverse the first and second compression sections towards the mid-plane of the compression chamber.

2. The system of claim 1, wherein the central chamber is configured to magnetically compress the compact tori plasma upon collision and merger thereof.

3. The system of claim 1, wherein the first and second formation sections and the central chamber are cylindrically shaped, a diameter of the central chamber being smaller than a diameter of the first and second formation sections, and wherein the first and second compression sections are truncated conically shaped with a diameter of the first on a first end being larger than a diameter on the second end.

4. The system of claim 1, wherein a plurality of active magnetic coils are disposed about and axially along the first and second formation sections and the central chamber.

5. The system of claim 1, further comprising triggering control and switch systems configured to enable a staged symmetric sequence of compact tori plasma formation in the first and second formation sections.

6. The system of claim 1 further comprising a plurality of DC magnetic coils disposed about and axially along the central compression chamber and the first and second formation sections to form a bias or DC guide field within and extending axially through the central compression chamber and the first and second formation sections.

7. The system of claim 1 further comprising a cylindrical shell or liner positioned within the central compression chamber for fast liner compression.

8. The system of claim 1 further comprising first and second diametrically opposed acceleration sections and third and fourth compression sections interposing the first and second compression sections and the central chamber, and the third and fourth compression sections interpose the central chamber and the first and second acceleration sections, and further comprising a plurality of DC magnetic coils disposed about and axially along the central compression chamber and the first and second formation sections, the first, second, third and fourth compression sections, and the first and second acceleration sections to form a bias or DC guide field within and extending axially through the central compression chamber and the first and second formation sections, the first, second, third and fourth compression sections, and the first and second acceleration sections.

9. A system for merging and compressing compact tori plasma comprising
a central chamber,
a pair of diametrically opposed formation sections,
a pair of diametrically opposed compression sections interposing the formation sections and the central chamber, the pair of compression sections having a conically constricting shape in a direction toward a midplane of the central chamber, and
a magnetic system configured to enable compact tori plasma formation in the pair of formation section, axial acceleration of the compact tori plasma toward the midplane of the central chamber, and magnetic compression of the compact tori plasma within the central chamber.

10. The system of claim 9, wherein the central chamber is configured to magnetically compress the compact tori plasma upon collision and merger thereof.

11. The system of claim 9, wherein the pair formation sections and the central chamber are cylindrically shaped, a diameter of the central chamber being smaller than a diameter of the pair of formation sections, and wherein the pair of compression sections are truncated conically shaped with a diameter on a first end being larger than a diameter on a second end.

12. The system of claim 9, wherein a plurality of active magnetic coils are disposed about and axially along the pair of formation sections and the central chamber.

13. The system of claim 9, further comprising triggering control and switch systems configured to enable a staged symmetric sequence of compact tori plasma formation in the pair of formation sections.

14. The system of claim 13, wherein the triggering control and switch systems are further configured to synchronize the compression of the compact tori plasma in the pair of compression sections with the compact tori plasma formation and acceleration in the pair of formation sections.

15. The system of claim 9 further comprising a plurality of DC magnetic coils disposed about and axially along the central compression chamber and the pair of formation sections to form a bias or DC guide field within and extending axially through the central compression chamber and the pair of formation sections.

16. The system of claim 9 further comprising a cylindrical shell or liner positioned within the central compression chamber for fast liner compression.

17. The system of claim 9, wherein the pair of formation sections and the pairs of compression sections are axially symmetric.

18. The system of claim 9 further comprising a pair of diametrically opposed acceleration sections and a second pair of compression sections interposing the pair of compression sections and the central chamber, and the second pair of compression sections interpose the central chamber and the pair of acceleration sections.

19. The system of claim 18, wherein the triggering control and switch systems are configured to synchronize the compact tori plasma formation and acceleration in the pair of formation sections and synchronize the compact tori plasma acceleration in the pair of acceleration sections.

20. The systems of claim 18 further comprising a plurality of DC magnetic coils disposed about and axially along the central compression chamber and the pair of formation sections, the pair of compression sections, the second pair of compression section and the pair of acceleration sections to form a bias or DC guide field within and extending axially through the central compression chamber and the pair of formation sections, the pair of compression sections, the second pair of compression section and the pair of acceleration sections.

* * * * *